Nov. 28, 1933.　　　　G. W. GODDARD　　　　1,936,595
AUTOMATIC PHOTOGRAPHIC APPARATUS
Filed July 15, 1929　　3 Sheets-Sheet 1

INVENTOR
GEORGE W. GODDARD
BY Robert H. Young
ATTORNEY

Nov. 28, 1933.  G. W. GODDARD  1,936,595
AUTOMATIC PHOTOGRAPHIC APPARATUS
Filed July 15, 1929  3 Sheets-Sheet 2
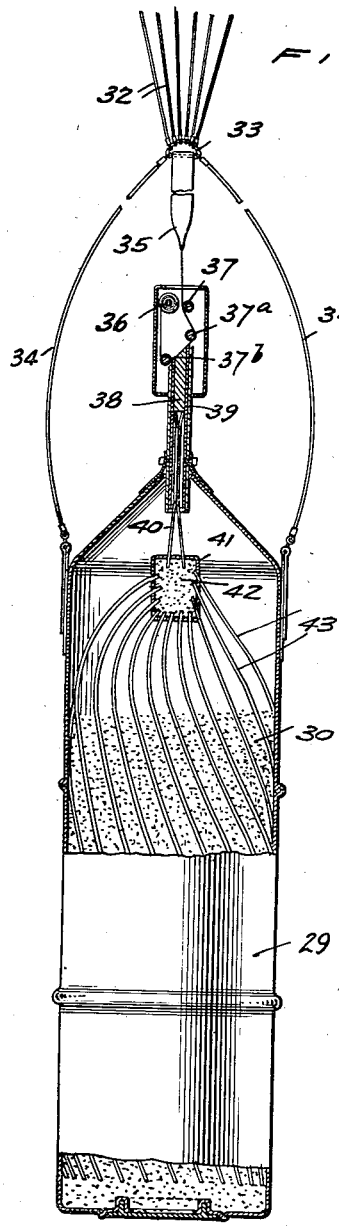
FIG. 3.
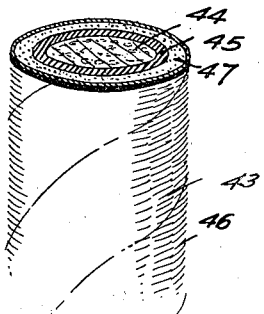
FIG. 4.
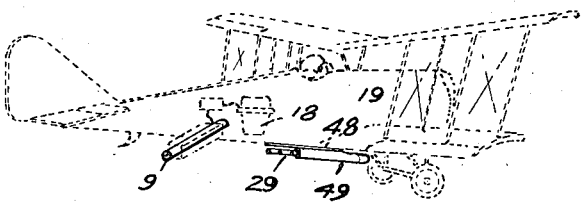
FIG. 5.
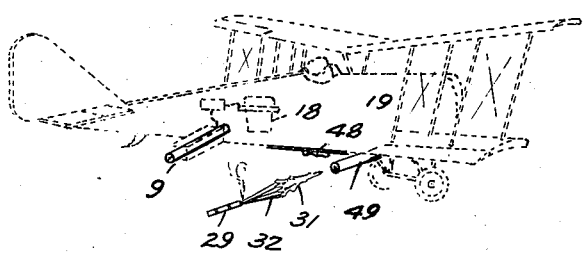
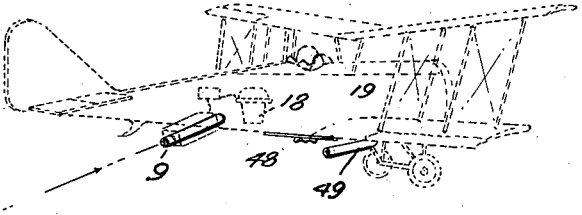
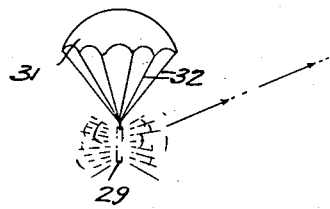
INVENTOR
GEORGE W. GODDARD
BY Robert H. Young
ATTORNEY Patented Nov. 28, 1933

1,936,595

UNITED STATES PATENT OFFICE 1,936,595

AUTOMATIC PHOTOGRAPHIC APPARATUS

George W. Goddard, Rantoul, Ill.

Application July 15, 1929. Serial No. 378,361

7 Claims. (Cl. 67—29)

(Granted under the act of March 3, 1883, as amended April 30, 1928; 370 O. G. 757)

The invention described herein may be manufactured and used by or for the Government for governmental purposes, without the payment to me of any royalty thereon.

The invention relates to photography and in particular to apparatus for taking flashlight pictures at night.

It has been the practice heretofore in flashlight photography to set the camera shutter in open position as for a time exposure. Then the flashlight is set off to illuminate the subject and the camera shutter is subsequently closed. In the use of this method in aerial photography, the resultant pictures are streaked due to automobile headlights, electric signs, and other sources of ground illumination. Similarly, in ground photography, any sources of light other than the flashlight, or reflecting surfaces, will cause streaks in pictures taken by the old method. When the subject to be photographed is a group of persons, for instance, any movement on the part of one of the persons will produce a blur in the picture. With the proposed new method, the picture is a snapshot and therefore the speed of the shutter prevents this blurring.

In the application of this invention to aerial photography, the flashlight must necessarily be produced by the explosion of an aerial bomb released from the aircraft over the terrain to be photographed at suitable altitude. In experimentation wherein personnel on board the aircraft attempted to impart snapshot operation to the camera shutter manually, after the bomb had been released and exploded, it was found that the shutter was operated too late, due to the comparatively slow reaction time of the operator in response to the visual stimulus produced by the flashlight. It is therefore an object of the invention to utilize light-sensitive mechanism capable of operating the shutter automatically upon explosion of the flashlight bomb at a speed unattainable by human agency.

A further object is to provide time-controlled mechanism for exploding the flashlight bomb in aerial photography after it has been released from the aircraft and has reached the most desirable position with respect to both the terrain to be illuminated and the aircraft-carried camera.

A still further object is to provide means for use in aerial photography to prevent premature operation of the camera shutter due to sources of light other than the flashlight bomb.

It is also an object to provide a flashlight bomb which will be reliable and efficient in operation. Other objects will appear as the following description is read in connection with the accompanying drawings in which:

Fig. 3 is a fragmentary sectional view of the flashlight bomb, showing the time-controlled mechanism for exploding the light producing charge.

Fig. 4 is a cross-sectional view of one of the powder trains which extend into the flashlight powder charge of the bomb;

Fig. 5 is a diagrammatic view of the flashlight apparatus mounted in an airplane, three successive stages of the use of the apparatus being shown.

The invention will first be described in its application to ground photography due to the fact that this form of the apparatus is less complex than that used in aerial photography and is thus best suited for description in the introductory explanation of the invention.

Figure 1:
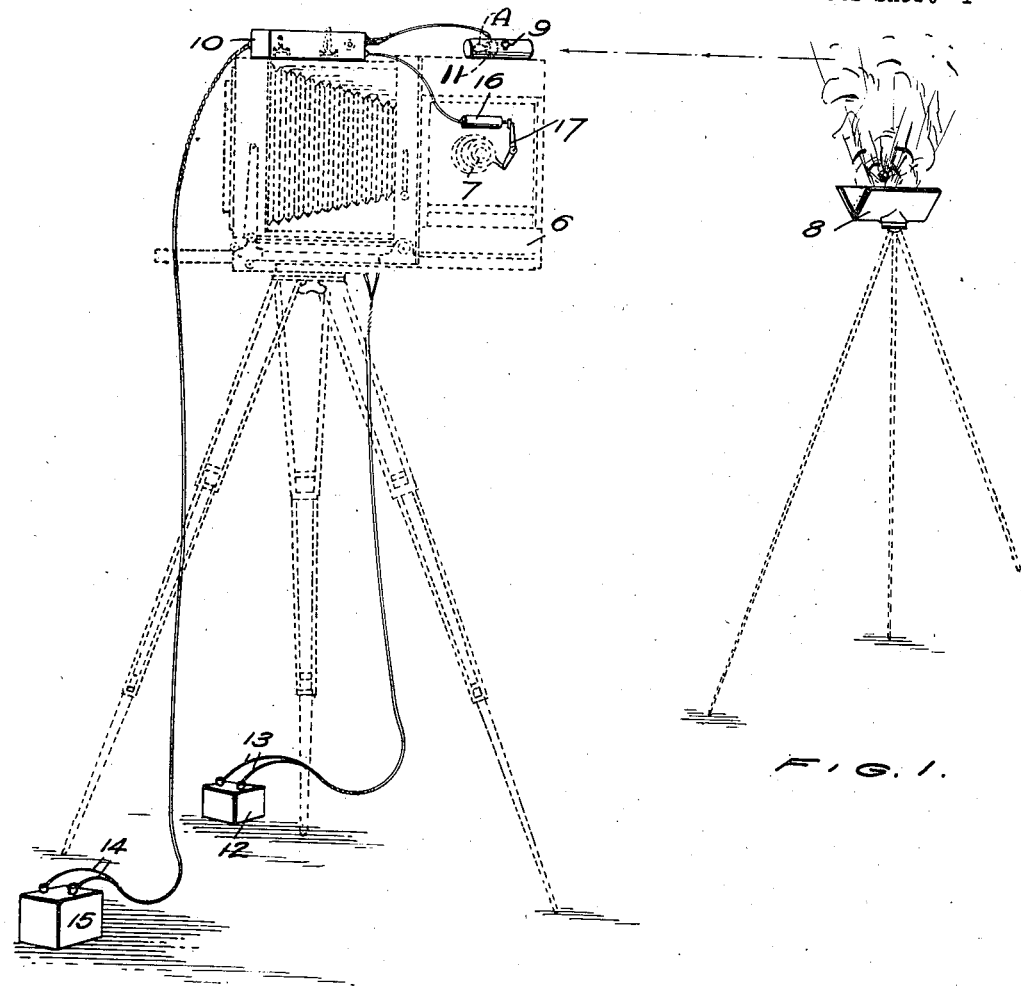
Fig. 1 is a perspective view of a studio camera with the improved flashlight apparatus arranged for use in connection therewith.

Referring to Fig. 1 of the drawings, the numeral 6 designates a camera of the kind ordinarily used in taking flashlight pictures in any location where the ordinary light is insufficient for instantaneous exposure. The camera has a shutter 7 controlling the admission of light to the plates or other sensitized material.

The numeral 8 designates a flashlight holder which may be of any type suitable for use in connection with the camera just described. This holder should be capable of being fired manually at will and should be positioned relative to the camera so as not to be included in the field of view of the camera but in a position where maximum illumination of the subject to be photographed may be accomplished.

In order to cause instantaneous operation of the camera shutter at the time of the production of photographic light by the flashlight holder, a photo-electric cell 9 is mounted in such a position relative to the holder that light rays from the flashlight will enter the cell. This cell may be mounted on the camera as shown, or may have any other desired support. It is not intended to be limited to any particular type of cell, it being necessary simply that some cell be utilized which will be sufficiently fast in its response to light from the flashlight device to cause instantaneous operation of the camera shutter. Therefore, the cell is only conventionally represented in the drawings.

Due to the fact that the known-light-sensitive cells are capable of causing the flow of weak current only, it becomes necessary to provide means for bringing a source of current of higher values into play in order to supply the power necessary for operation of the camera shutter. In seeking such means, a standard relay of well known construction has been selected together with a vacuum tube amplifier which is used as an intermediate stage between the photo-electric cell and the relay. It should be obvious, however, that some other means for this purpose may be utilized hereafter in practice without departing from the broad scope of the invention.

The relay is conventionally represented in the drawings and is designated by numeral 10, due to the desirability of avoiding detailed disclosure of an element of the entire assembly for which element no invention is claimed in this application.

Figure 6:
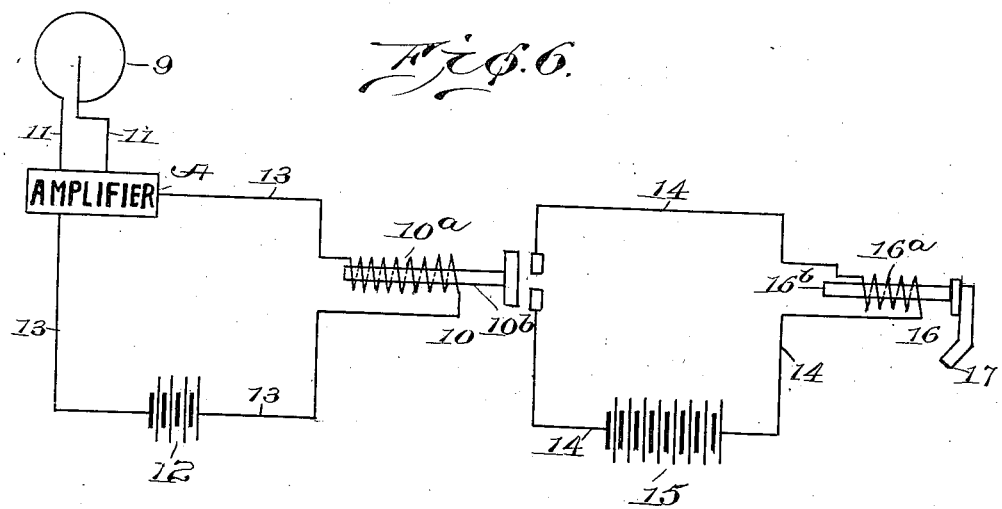
Figure 6 is a diagrammatic view of the electric circuits of the camera operating apparatus.

As diagrammatically illustrated in Fig. 6, the photo-electric cell 9 is connected in circuit by conductors 11 with a vacuum tube amplifier unit A which is intercalated between the said cell and the magnetic coil 10a of the relay 10. The unit A amplifies the minute changes in current produced by the flow of electrons across the elements of the photo-electric cell 9, which electrons are set in motion by light from the flash, in order that the relay 10 may be actuated to produce action of the camera shutter in instantaneous response to the actuation of the cell 9. The primary circuit of the relay 10 includes an electric battery 12 connected by conductors 13 with the amplifier unit A and the magnetic coil 10a. The secondary circuit of the relay includes conductors 14, secondary battery 15 and the coil 16a of solenoid 16 and is normally open, being closed upon energization of coil 10a by the armature 10b. The core 16b of solenoid 16 is adapted to actuate the shutter trip mechanism 17. When the photo-electric cell is acted upon by rays of light from the flash, the primary relay circuit is energized to actuate the magnetic coil 10a to close the secondary relay circuit through the armature 10b. The closing of the secondary relay circuit permits a stronger current from battery 15 to energize solenoid coil 16a for operating the camera shutter through the actuation of solenoid core 16b and shutter-trip mechanism 17.

The method which is capable of being carried out by use of the apparatus disclosed in Fig. 1 of the drawings is as follows, broadly stated: After the preliminary steps of loading the camera focusing it properly on the subject to be photographed, setting the shutter for instantaneous exposure, and loading the flashlight holder, the flashlight is fired and the shutter is automatically operated by the light from the flashlight to make an instantaneous exposure of the film. The last two steps are considered to be novel. Operation of the shutter is thus effected in instantaneous response to the light emission of the flashlight device, which is not possible of accomplishment by human manipulation of the shutter.

The adaptation of the invention to aerial photography will now be described. It comprises two physically separate parts. One is the apparatus permanently mounted in an aircraft, and the other is the flashlight bomb which is to be released from the aircraft in flight and is subsequently exploded while supported by a parachute alone.

Figure 2:
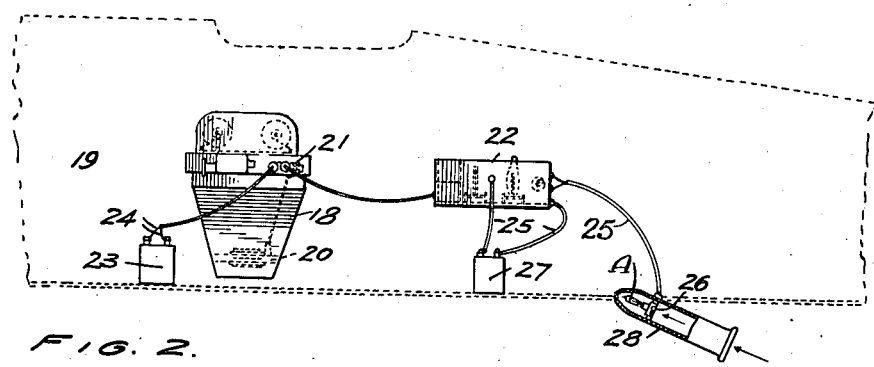
Fig. 2 is a fragmentary sectional view of the airplane in which the apparatus is mounted, showing the details of construction of the light-sensitive camera operating mechanism.

Referring to Fig. 2, the aircraft-carried apparatus is composed of elements corresponding to those previously described in connection with the ground camera. 18 designates a typical aerial camera mounted in the fuselage 19 of an airplane in a position for taking vertical photographs. This particular camera is adapted to take strip-pictures in mapping work. The shutter is represented in broken lines at 20 and may be either "between-lens" or "focal plane" type. The solenoid 21 is operatively connected with the shutter by suitable mechanism and has its coil connected in the secondary circuit of the conventional relay 22 and its source of current 23 by conductors 24. The primary side of the relay is connected by conductors 25 with the photo-electric cell 26, through the vacuum tube amplifier A and includes the source of current 27. The tubular casing 28 which houses the light sensitive cell should be positioned in the airplane fuselage at such an angle that the cell proper will be screened against light coming from the aircraft and from the ground directly beneath the latter. Subsequently the cell will not be affected by light unless the source is located in rear of the airplane and in line with the axis of the casing 28. This will insure against accidental operation of the camera shutter by light coming from sources other than the flashlight bomb. Furthermore, it will prevent operation of the camera shutter at any time except when the flashlight bomb explodes at the proper location for correct illumination of the terrain to be photographed and is out of the field of view of the camera.

The aircraft-carried apparatus will be described later in connection with Fig. 5.

The flashlight bomb includes a frangible case 29 which contains a charge of flash powder 30 which is adapted to burst the case when exploded and produce a brilliant light suitable for photographic illumination from the air. The bomb case 29 is attached to a parachute, indicated by the numeral 31 in Fig. 5, by means of the usual shroud lines 32. These shroud lines are attached to a concentration ring 33 which in turn is attached to the case by slack lines 34. A tape 35 has one end attached to the ring 33 and its other wound around a spool 36 carried by the bomb case. This tape extends around guide rollers 37, 37a, and 37b, which causes it to bear against the beveled end of an igniting candle 38 mounted in a tube 39 projecting from the upper end of the bomb case. The end of the tape which is carried by the spool is coated with phosphorus throughout a predetermined length. A powder train 40 extends from the igniting candle through tube 39 into the upper end of the bomb case and leads to a container 41 filled with black powder 42. Numerous powder trains branch out from the casing 41 and extend through the entire mass of flashlight powder in the lower part of the bomb case. The entire assembly of ignition candle and powder trains 40, 42, and 43, constitutes the time fuse for the bomb. The length and burning rate of the fuse should be such that the bomb will be at the correct distance in the rear of the airplane (usually 400 to 500 feet) before the flashlight explosion occurs. As soon as the ignition tape has been pulled, the lines 34 will have lost their slackness and will thereafter cause the weight of the bomb to be supported by the parachute.

In order to produce a flashlight of maximum brilliancy, it is necessary that the entire flashlight charge shall explode instantaneously. Progressive burning or explosion from top to bottom will not suffice. To accomplish the desired purpose the powder trains 43 have been made of a special construction. Referring to Fig. 4, it will be noticed that each train is composed of an inner core 44 of cord or other flexible material, a coating 45 of gum arabic for the cord 44, an outer covering 46 of paper, or other light, inflammable material and a loose filling 47 of powder interposed between the core and the outer covering. Powder trains of this kind will flare up almost instantly throughout their entire length. By having numerous powder trains running through the entire charge of flashlight powder, the whole charge will explode at once.

Referring now to Fig. 5, it will be noted that each flashlight bomb to be carried into the air is adapted to be supported beneath a convenient part of the airplane by means of the standard bomb rack 48. Directly ahead of each bomb rack, a hinged tube 49 is mounted for reception of the parachute of the bomb carried by the rack. The rack is connected to the usual bomb releasing mechanism (not shown). Although a single bomb rack and parachute tube unit is disclosed in Fig. 5, it is obvious that a plurality may be used in order to drop a number of flashlight bombs in properly timed sequence when making a strip photograph with an automatic, time-controlled camera. In photography of this kind, the releasing of bombs may be accomplished manually, or by means of time-controlled mechanism, (not shown), which is synchronized with the standard camera intervalometer.

The operation of the apparatus in making an aerial flashlight photograph should be clearly apparent upon reference to the three stages illustrated in Fig. 5. In the first stage, the aircraft is flown straight and level over the ground area to be photographed. The camera normally has its shutter closed and set for instantaneous exposure, or snapshot, operation. The bomb is supported by the rack and the parachute is shielded against the "slipstream" and other air motion in its tube. At the appropriate moment, which is the time at which the airplane is about 500 feet short of a point directly over the center of the area, the bomb release mechanism is actuated to release the flashlight bomb. The latter falls clear of the airplane and pulls the parachute out of the tube, which turns downward on its hinge, as shown in the illustration of the second stage, to prevent the parachute from becoming caught in the bomb rack or any other part of the aircraft. The parachute, as it opens, offers greater resistance to the air than the bomb and therefore pulls the ignition tape while the slack lines are becoming extended. Thereafter, the parachute supports the bomb and causes it to descend slowly toward the earth. The fuse burns and at the predetermined instant of time causes the bomb to explode. This should occur when the bomb is in the position relative to the airplane shown in the third stage of Fig. 5. In this position, the bomb will be entirely outside the field of view of the camera and within the field of view of the light-sensitive cell. Light from the exploding bomb penetrates the tubular shield which contains the cell just mentioned and causes the latter to react in the previously described manner. Through the means of the relay and primary and secondary sources of current, the camera shutter is instantaneously operated so as to make an instantaneous exposure of the film or the equivalent photographic medium. The method used in the making of the photograph is substantially the same as that described in connection with the disclosure in Fig. 1.

What is claimed is,

1. An apparatus for flash light photography including a camera, and electrical means including a photo-cell amplifier unit for effecting synchronization of the camera shutter movement with the flash.

2. An apparatus for flash light photography including a camera, flash-producing means, and light-sensitive means for imparting exposure operation to the camera shutter.

3. An apparatus for flash light photography including a camera, flash-producing means, and light sensitive means responsive to the flash for imparting exposure operation to the camera shutter at the instant of maximum light.

4. An apparatus for flash-light photography including a camera, flash-producing means, a photo-electric cell responsive to light generated by the flash-producing means, and means controlled by the photo-electric cell for imparting exposure operation to the camera shutter.

5. An apparatus for flash light photography including a camera having a solenoid-operated shutter, a photo-cell amplifier unit, and a sensitive relay for electrically connecting the said photo-cell amplifier unit with the said solenoid-operated shutter whereby instantaneous exposure operation of the camera shutter is imparted by the response of the photo-cell to the light of the flash.

6. An aerial photographic apparatus including an aircraft-carried camera, a moving source of light timed to flash when out of the field of view of the camera, and shutter-actuating means controlled by a light-sensitive element responsive to the light from the flash for imparting instantaneous exposure operation of the camera shutter at the instant of maximum light.

7. An aerial photographic apparatus including, in combination with an airplane, of an aerial camera carried thereby, means for releasing a flash-light bomb, light-responsive means for imparting instantaneous exposure operation of the camera shutter including a photo-electric cell on the underside of the fuselage floor of the airplane, and a light shield inclosing said photo-electric cell and having a light-admitting opening adapted when the airplane is in flying position to face toward the approximate position of the bomb at the time of the explosion of the latter.

GEORGE W. GODDARD.